Dec. 8, 1936.  H. W. RUPPLE  2,063,831
METALWORKING MACHINE
Filed Nov. 18, 1933   4 Sheets—Sheet 1

INVENTOR
HARRY W. RUPPLE
Kwis Hudson & Kent
ATTORNEYS

INVENTOR:
HARRY W. RUPPLE
ATTORNEYS

Dec. 8, 1936.  H. W. RUPPLE  2,063,831
METALWORKING MACHINE
Filed Nov. 18, 1933  4 Sheets-Sheet 3

INVENTOR:
HARRY W. RUPPLE
Kwis Hudson & Kent
ATTORNEYS

Dec. 8, 1936.  H. W. RUPPLE  2,063,831
METALWORKING MACHINE
Filed Nov. 18, 1933  4 Sheets-Sheet 4

INVENTOR:
HARRY W. RUPPLE
ATTORNEYS

Patented Dec. 8, 1936

2,063,831

UNITED STATES PATENT OFFICE 2,063,831

METALWORKING MACHINE

Harry W. Rupple, Shaker Heights, Ohio, assignor to The Cleveland Automatic Machine Company, Cleveland, Ohio, a corporation of Ohio Application November 18, 1933, Serial No. 698,653

19 Claims. (Cl. 29—38)

The present invention relates primarily to the art of metal working machine tools and more particularly to the spindle head mechanism of a multiple spindle indexible turret type of either chucking machine or bar machine.

Machines of the general character referred to usually comprise a plurality of spindles rotatably supported in an indexible spindle head equally spaced about the axis of rotation of the turret. The spindles are provided with chucks adapted to hold the work pieces or blanks which are indexed successively through a plurality of tool stations upon the indexing of the spindle turret. The desired machine operations are performed on the work by one or a plurality of tools at the different tool stations. During the cycle of operations, that is during one complete revolution of the turret, the finished work is removed and either a new piece inserted in the chuck or the stock fed forward through the spindle, depending upon whether the particular machine being considered is a chucking machine or a bar machine. Ordinarily the chucking or feeding operation takes place at one of the stations known as the loading station, but may be performed, especially in the case of a bar machine, either during the indexing of the turret or at one of the tool stations, such as the cutting off station.

In the operation of machines of the character referred to it becomes necessary to effect certain operations of the various spindles and/or the turret in sequence, that is it becomes necessary to move certain elements of either the spindles and/or the turrets relative to other elements thereof to perform certain operations such as, opening and closing the chucks of the various spindles in sequence during the loading operations, stopping and starting the spindles at one or more of the stations, or varying the speed of the spindles at different stations. The performance of these operations by power means involves the use of more or less complicated mechanism for transmitting the power from the stationary bed of the machine to the movable turret and/or spindles whichever the case may be. Heretofore in the art various devices and arrangements of elements have been provided for performing these operations by power, that is the movement of the various parts of the spindles relative to each other to perform the necessary operations etc., some of which have been quite satisfactory, but all of which fail to meet the requirements of present day production methods.

Ordinarily the chucks are carried by spindles rotatably supported in the turret, but the chucks may be stationary with reference to the turret, and the tools, etc. rotated, in which case the machine consists primarily of a plurality of chucks supported on an indexible turret. In machines of this character it is also necessary to perform certain operations on the turret in sequence as the chucks index through the various stations, such as opening and closing the chucks to permit the chucking or feeding of the work, and the problem of transmitting power to the rotatable turret is the same as that in the rotatable spindle type of machine. The present invention is applicable to either type of machine although it is hereinafter described with reference to the preferred embodiment thereof which is a chucking machine of the rotatable spindle type.

An object of the present invention is the provision of a novel means for moving various elements of the spindles and/or turret relative to other elements thereof whereby the different required operations are effected, and the provision of a novel means for controlling the same.

Another object of the invention is the provision of a novel machine wherein power means is employed for actuating some or all of the spindle and/or turret mechanism such as the chucks, clutches, brakes, etc. of machines of the character described, which will be rugged in construction, positive and reliable in operation, and readily controlled by either manual or automatic means.

Other objects of the invention are the provision of a novel machine tool of the character referred to wherein fluid operative mechanism is employed to perform one or more spindle and/or turret operations, and the provision of a novel distributing valve for controlling the supply and discharge of fluid pressure to a plurality of spindle mechanism, or chuck operating mechanisms in machines of the character referred to.

Further objects and advantages of the invention will be apparent to those skilled in the art from the following description of the preferred embodiment of the invention, described with reference to the accompanying drawings in which Figure 1 is an elevation of the spindle turret end of an automatic metal working chucking machine tool embodying the present invention;

Similar reference characters designate corresponding parts throughout the various figures of the drawings.

Figure 1:
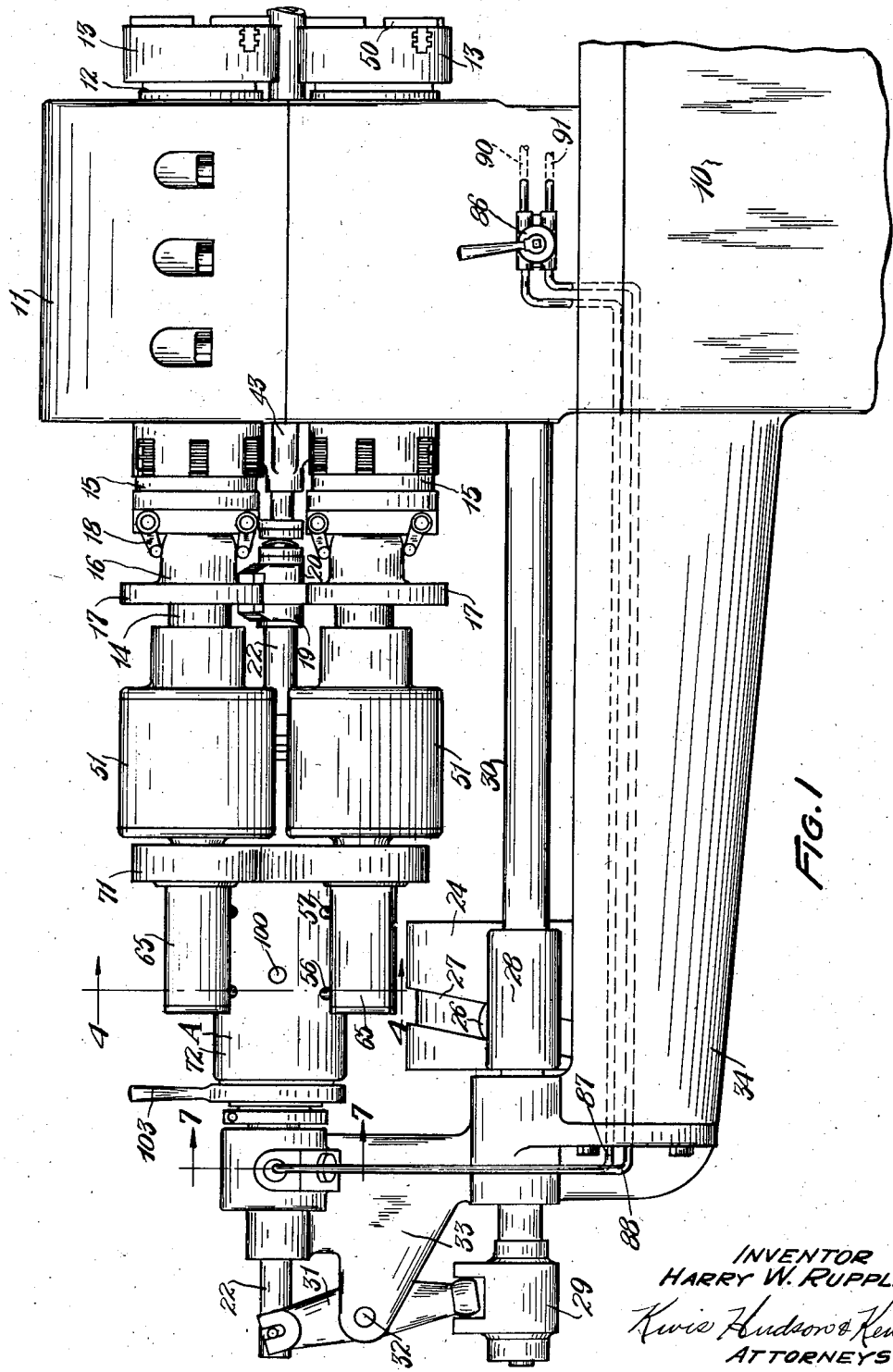
Figure 2:
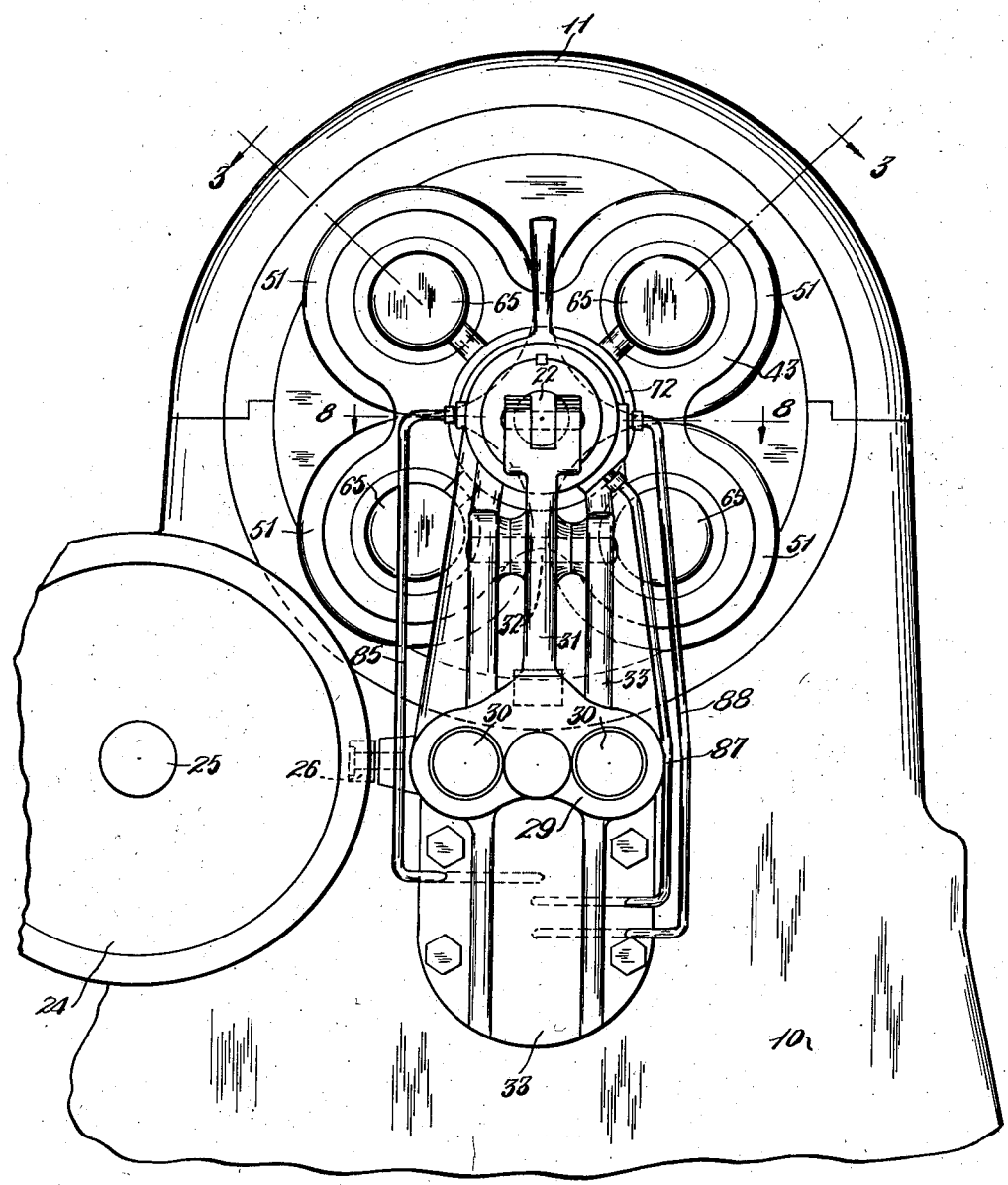
Fig. 2 is an end elevation of the machine shown in Fig. 1, looking from the left as viewed in Fig. 1.

The present invention is illustrated as embodied in a four spindle indexible turret type of chucking machine similar to that illustrated in my copending application Serial No. 584,421, filed January 2, 1931, and those parts of the machine which are necessary to a clear understanding of the invention are herein illustrated and described. The remainder of the machine is old and well known in the art and may be found embodied in a plurality of different structures.

Referring to the drawings, the reference character 10 designates the bed of the machine in general of which only the spindle end is shown. An indexible spindle turret rotatably supported in the spindle head 11 carries a plurality of work spindles 12 rotatably supported in suitable longitudinal apertures in the spindle turret, equally spaced about the axis of rotation of the turret. The spindle turret is periodically indexed in such a manner that the chucks 13 carried by the spindle tubes 14 are indexed through a plurality of tool stations, at which stations the desired machine operations etc. are performed on the work.

The spindles are driven from the main drive of the machine, and a plurality of clutches designated in general by the reference character 15, are interposed in the spindle drives so that the spindles may be stopped at one or more stations during the cycle of operation. The clutches 15 are engaged and disengaged to connect and disconnect the drive with the spindles by the reciprocation of the clutch thimbles 16 provided with flanges 17 through the medium of bell crank levers 18.

The clutch thimbles 16 are slidably supported on the spindle tubes 14 and as they are successively positioned in the loading station by the indexing of the spindle turret the flanges 17 project between two members 19 and 20 slidably keyed on a shaft 22 supported coaxial with the spindle turret. The members 19 and 20 are normally held in spaced relation so as not to interfere with the indexing of the spindle turret by a coil spring 23.

Figure 3:
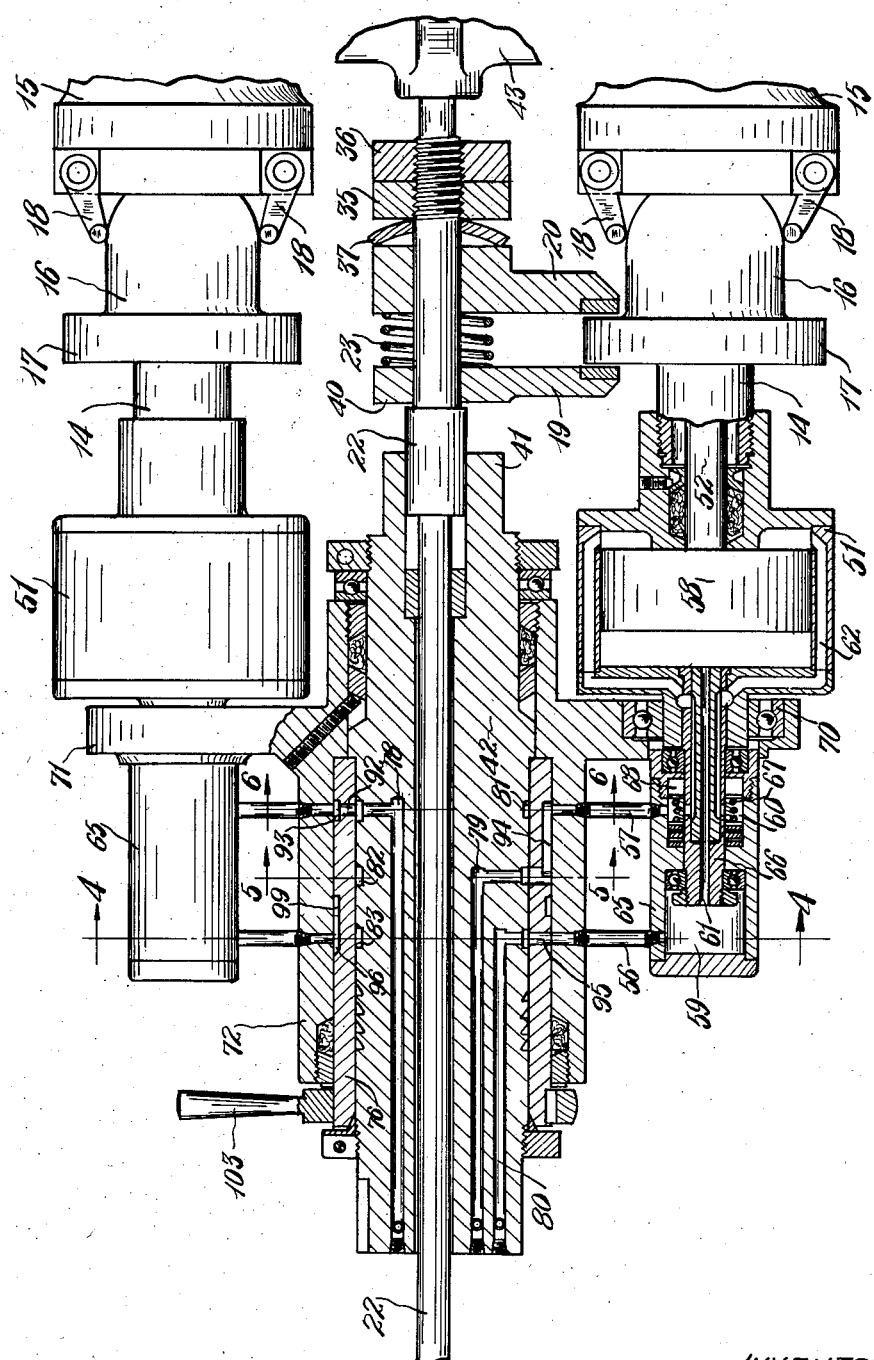
Fig. 3 is a top plan view, partly diagrammatic, with portions in section, approximately on the lines 3—3 of Figs. 2 and 4.
Figure 4:
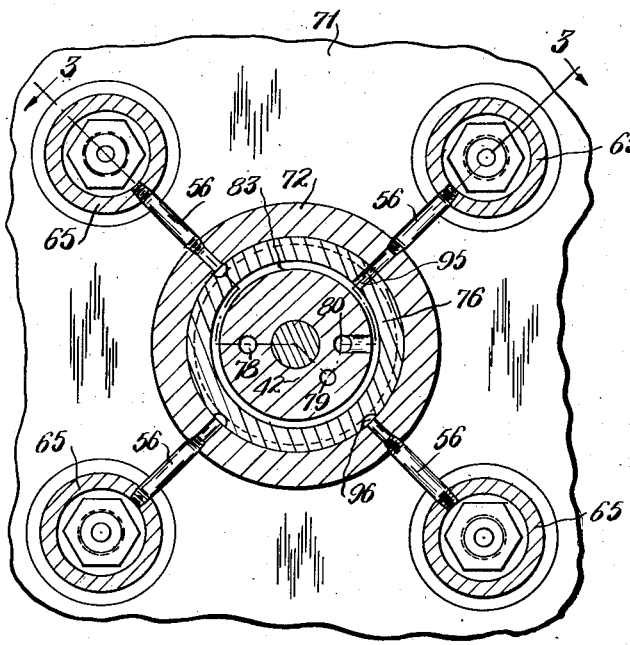
Fig. 4 is a section on the lines 4—4 of Figs. 1 and 3.
Figure 5:
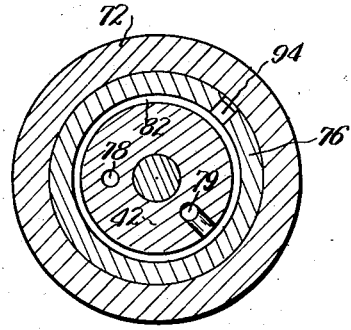
Fig. 5 is a section taken on the line 5—5 of Fig. 3.
Figure 7:
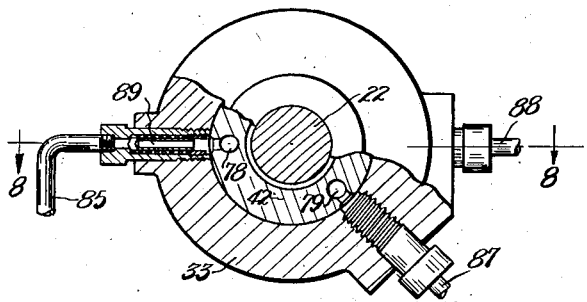
Fig. 7 is a section on the line 7—7 of Fig. 1 with portions in elevation.
Figure 6:
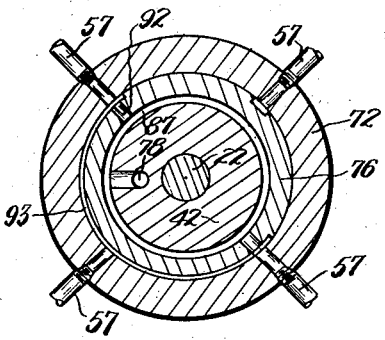
Fig. 6 is a section taken on the line 6—6 of Fig. 3.
Figure 8:
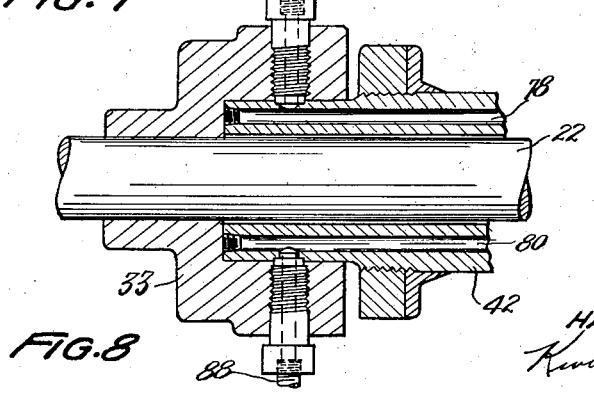
Fig. 8 is a section, with portions in elevation, on the lines 8—8 of Figs. 2 and 7.

The shaft 22 is reciprocated in predetermined timed relation to the indexing of the spindle turret, etc., by a cam drum 24 fixed on the main camshaft 25 of the machine, through the medium of a cam roller 26 which engages in a cam groove 27, members 28 and 29 slidably supported on rods 30 and connected so that they move as a unit, and a walking beam 31 pivotally supported on a pin 32 secured in a bracket 33 bolted to the horn 34 of the frame 10. Adjusting nuts 35 and 36 threaded onto the end of the shaft 22 limit the movement of the members 19 and 20 on the shaft 22 and provide for their adjustment with reference to the flanges 17. A spring washer 37 is interposed between the member 20 and the nut 35 to provide yieldable means for engaging the flange 17 between the members 19 and 20 upon movement of the shaft 22 towards the left, as viewed in Figs. 1 and 3. After the drive has been disengaged from the spindle, a brake is applied to the same by the continued movement of the shaft 22 which causes the face 40 of the member 19 to engage the end face 41 of a member 42. The front end of the shaft 22 is slidably supported in a spider member 43 bolted to the spindle head 11.

The chuck jaws 50 of the chucks 13 are actuated to engage and disengage the work by fluid pressure motors 51, the piston rods 52 of which are operatively connected with the chuck rods, not shown. The fluid pressure motors 51 are of the double action reciprocating piston type, and are secured to the rear end of the spindle tubes 14. The construction and operation of the machine so far described are similar to that disclosed in my aforesaid copending application and reference is made thereto for a more detailed drawing and description of the machine.

Fluid is supplied to and discharged from the motors 51 through pipe connections 56 and 57 which communicate with opposite sides of the pistons 58 of the motors 51 through chambers 59 and 60 and ducts 61 and 62 respectively. The pipes 56 and 57 are threaded into members 65 rotatably supported on rearwardly extending projections 66 on the fluid pressure motors 51. The reference character 67 designates a coil spring positioned in the chamber 60, which compresses the packing designated in general by the reference character 68.

In operation, the rearwardly extending projections 66 revolve within the members 65, upon the rotation of the spindles 12 and the fluid pressure motors 51 secured to the spindles. The motors are rotatably supported by anti-friction bearings 70 in a spider-shaped member 71 formed integral with a member 72 or fixed thereto, and the spindles 12, fluid pressure motors 51, spider-shaped member 71, and member 72 index as a unit with the turret.

A cylindrical member 76 interposed between the members 42 and 72 together with these members constitute the fluid distributor designated in general by the reference character A. The member 42 is non-rotatably secured in the bracket 33 and under normal operating conditions the member 76 remains stationary with the member 42 while the external member 72 revolves thereabout with the indexing of the turret. The internal member 42 of the distributor is provided with passages 78, 79 and 80 which communicate with annular passages 81, 82 and 83, respectively, on the exterior of the member 42. The passage 78 is connected by means of a pipe 85 with a source of fluid pressure and the ducts 79 and 80 are connected to a manual valve 86 by pipes 87 and 88 respectively. A check valve 89 is interposed between the passage 78 and the pipe 85. The pipes 87 and 88 are adapted to be alternately connected with a source of fluid pressure and with exhaust upon manipulation of the valve 86 by means of the pipes 90 and 91, the former of which is connected to a source of fluid pressure while the latter is open to exhaust.

The intermediate member 76 of the distributor A is provided with a port 92 which communicates with the annular passage 81 and a semi-annular passage 93 formed in the exterior of the member 76. The semi-annular passage 93 is in communication with the pipes 57 of the motors in the working stations and provides a constant supply of fluid to maintain the chucks in these stations closed. A plurality of passages 94 and 95 in the member 76 communicate with the annular passages 82 and 83 and the pipes 57 and 56 respectively of the motors in the loading station, which places the motor in the loading station under the control of the valve 86.

The pipes 56 of the motors in the working stations are open to exhaust through a plurality of longitudinal passages 96 which communicate with an annular passage 99. In the present embodiment wherein air is employed as the fluid, the annular passage 99 is constantly open to atmosphere through the passage 100, but it will be understood that the passage 99 may be connected by suitable passages in the members 42 and 76 and pipes, etc., to a sump, etc., in the event that oil is employed.

From the foregoing description of the preferred embodiment it will be apparent that upon indexing of the turret the motors are successively disconnected from the passage 93, etc., and connected to the passages 94 and 95, etc., and that upon the next indexing operation they are again connected to the passage 93, etc. While the motors are in the loading station, they are under the direct control of the valve 86 which in the present embodiment is a manually operated valve, but it will be apparent that an automatically actuated valve controlled from the cam shaft 25, or other suitable mechanism may be substituted therefor. A valve or construction of this type is illustrated in my copending application Serial No. 575,734.

The intermediate member 76 of the distributor A is provided with a handle 103 whereby it may be rotated with reference to the other two members 42 and 72 to open the chucks in any station, as in setting up the machine, etc., or to make any of the stations the loading station. When this feature of operation is not desired, it will be apparent that the distributor may be constructed in two parts and the annular passages 81, 82 and 83 eliminated. It will also be understood that a distributor thus constructed could be made to perform the present operating features by rotatably supporting the internal member in the bracket 33 and providing means for rotating the same.

The invention has been described with reference to the preferred embodiment thereof, but I do not wish to be limited to the particular construction shown which may be widely varied within the scope of this invention. It is to be understood that the fluid pressure motors may take different forms, and that they may be connected to operate parts of the spindle mechanism other than the chucks, such as the clutches, and/or stock feeding mechanism. Internal chucks may be substituted for the external chucks shown by interchanging or crossing the pipes 56 and 57. The invention may be applied to "rod" or "bar" machines by providing openings through the centers of the motors, spindles, etc., for the passage of stock. This application is intended to cover any and all variations, adaptations or uses therefor as come within the knowledge or customary practice in the art to which it appertains, and I particularly point out and claim as my invention:

1. The combination of a plurality of fluid pressure motors, means for conducting fluid to said fluid pressure motors having a plurality of pairs of passages adapted to be successively connected with each of said fluid pressure motors, and means for alternately connecting one of said pairs of passages with a source of fluid pressure and with exhaust.

2. The combination of a plurality of fluid pressure motors, means for connecting said fluid pressure motors with a source of fluid pressure and with exhaust, said means comprising a member having a pair of passages in communication with a plurality of said fluid pressure motors and a second pair of passages adapted to be serially connected to said fluid pressure motors, and means for alternately connecting said second pair of passages with a source of fluid pressure and with exhaust.

3. The combination of a plurality of fluid pressure motors, means for conducting fluid pressure to said motors having a pair of passages in communication with one of said fluid pressure motors, means for connecting said pair of passages with a source of fluid pressure and with exhaust, said first mentioned means having a second pair of passages in communication with another of said fluid pressure motors, means for successively connecting said fluid pressure motors with said pairs of passages, and means for alternately connecting said second pair of passages with a source of fluid supply and with exhaust.

4. The combination of a plurality of fluid pressure motors, means for conducting fluid pressure to said motors having a pair of passages in communication with a plurality of said fluid pressure motors, means for connecting said pair of passages with a source of fluid pressure and with exhaust, said first mentioned means having a second pair of passages in communication with another of said fluid pressure motors, means for successively connecting said fluid pressure motors with said pairs of passages, and means for alternately connecting said second pair of passages with a source of fluid pressure and with exhaust.

5. The combination of a plurality of fluid pressure motors, means for conducting fluid pressure to and from said motors having a pair of passages in communication with a plurality of said fluid pressure motors, means for connecting said pair of passages with a source of fluid pressure and with exhaust, said first mentioned means having a second pair of passages adapted to be successively connected with each of said fluid pressure motors after the same have been disconnected from said first mentioned pair of passages, and means for alternately connecting said second pair of passages with a source of fluid pressure and with exhaust.

6. In a machine of the character described, the combination of a turret, a plurality of fluid pressure motors supported by said turret, means for rotating said turret, means for connecting a plurality of said fluid pressure motors with a source of fluid pressure and with exhaust, a member having a pair of passages adapted to be successively connected with each of said fluid pressure motors after the same have been disconnected from the first mentioned means, and means for alternately connecting said pair of passages with a source of fluid pressure and with exhaust.

7. In a machine of the character described, the combination of an indexible turret, a plurality of fluid pressure motors supported by said turret, means for indexing said turret, means for conducting fluid pressure to said motors having a pair of passages in communication with a plurality of said fluid pressure motors, means for connecting said passage with a source of fluid pressure and with exhaust, said first mentioned means having a second pair of passages adapted to be successively connected with each of said fluid pressure motors after the same have been disconnected from said first mentioned pair of passages, and means for alternately connecting said second pair of passages with a source of fluid pressure and with exhaust.

8. The combination of a plurality of fluid pressure motors, means for connecting a plurality of said fluid pressure motors with a source of fluid pressure and with exhaust, a member having a pair of passages to be successively connected with each of said fluid pressure motors after the same have been disconnected from the first mentioned means, and means for alternately reversing the direction of flow of fluid pressure in said pair of passages.

9. In a machine of the character described, the combination of an indexible turret, a plurality of fluid pressure motors supported by said turret, means for indexing said turret, a member indexible with said turret provided with a plurality of pairs of ports communicating with said motors, a member provided with a plurality of pairs of ports for conducting fluid to and from said motors, one pair of said second mentioned pairs of ports being connected with a source of fluid supply and with exhaust and with a plurality of said first mentioned pairs of ports, another pair of said second mentioned ports being adapted to be successively connected with said first mentioned pairs, and means for reversing the direction of flow of fluid in the second pair of said second mentioned ports.

10. In a metal working machine, a plurality of fluid pressure chucking devices, a pressure fluid distributor including a member having a pair of passages in communication with a plurality of said chucking devices, means for connecting one of said passages to a source of fluid pressure and the other thereof with exhaust, said distributor having a pair of passages to be serially connected with each of said chucking devices after the latter have been disconnected from said first mentioned annular passages, and valve means for alternately connecting said pair of passages with a source of fluid pressure and with exhaust.

11. The combination of a plurality of fluid pressure motors, means for connecting said fluid pressure motors with a source of fluid pressure and with exhaust, said means comprising a member having a plurality of pairs of passages, means for alternately connecting one of said pairs of passages with the source of fluid pressure and with exhaust, and means for moving said member whereby the last mentioned pair of passages may be connected with any of said fluid pressure motors.

12. The combination of a frame, a turret rotatably supported by said frame, a plurality of fluid pressure motors supported by said turret, means for rotating said turret, means for connecting a plurality of said fluid pressure motors with a source of fluid pressure and with exhaust, a member supported by said frame having a pair of passages adapted to be successively connected with each of said fluid pressure motors after the same have been disconnected from the last mentioned means, means for alternately connecting said pair of passages with a source of fluid pressure and with exhaust, and means for moving said member relative to said frame to vary the angular position of said turret at which said fluid pressure motors are connected to said pair of passages.

13. In a machine of the character described, the combination of a frame, a spindle turret rotatably supported by said frame, a plurality of spindles rotatably supported by said spindle turret, a fluid pressure actuated device carried by each of said spindles, means for indexing said turret whereby said spindles are indexed through a plurality of stations, a member supported by said frame having a plurality of pairs of passages adapted to be successively connected to said fluid pressure devices upon indexing of said turret, means for alternately connecting one of said pairs of passages with a source of fluid pressure and with exhaust, and means for moving said member relative to said frame whereby the last referred to pair of passages may be connected to said fluid pressure devices at any of the stations.

14. In a device of the character referred to, the combination of a plurality of fluid pressure actuated motors, a member having a passage in constant communication with a plurality of said motors and a pair of passages to be serially connected to each of said motors, means for moving said member to serially disconnect said motors from the first mentioned passage and connect the same to said pair of passages, means for connecting the first mentioned passage with a source of fluid pressure, and means for alternately connecting said pair of passages with a source of fluid pressure and with exhaust.

15. In a device of the character referred to, the combination of a plurality of fluid pressure actuated motors, a member having a pair of passages in constant communication with a plurality of said motors and a second pair of passages to be serially connected to each of said motors, means for moving said member to serially disconnect said motors from the first mentioned pair of passages and connect the same with the second mentioned pair of passages, means for connecting the first mentioned pair of passages with a source of fluid pressure and with exhaust, and means for alternately connecting the second mentioned pair of passages with a source of fluid pressure and with exhaust.

16. In a device of the character referred to, the combination of a turret, means for rotating said turret, a plurality of fluid pressure actuated motors carried by said turret, a member rotatably supported coaxially with said turret having a passage in constant communication with a plurality of said motors and a pair of passages to be serially connected to each of said motors, means for rotating said member to serially disconnect said motors from the first mentioned passage and connect the same to said pair of passages, means for connecting the first mentioned passage with a source of fluid pressure, and means for alternately connecting said pair of passages with a source of fluid pressure and with exhaust.

17. In a device of the character referred to, the combination of a turret, means for rotating said turret, a plurality of fluid pressure actuated motors carried by said turret, a rotatable member supported coaxially with the axis of rotation of said turret provided with a pair of passages in constant communication with a plurality of said motors and a pair of passages to be serially connected to each of said motors, means for rotating said member whereby said motors are serially disconnected from the first mentioned pair of passages and connected to the second mentioned pair of passages, means for connecting the first mentioned pair of passages with a source of fluid pressure and with exhaust, and means for alternately connecting the second mentioned pair of passages with a source of fluid pressure and with exhaust.

18. In a metal working machine of the character referred to the combination of a turret, a plurality of fluid pressure actuated chucking devices carried by said turret, means for intermittently rotating said turret whereby said chucking devices are indexed through a plurality of tool stations, a member rotatably supported coaxially with said turret having a passage in constant communication with a plurality of said chucking devices and a pair of passages to be serially connected to each of said chucking devices at one of said stations, means for connecting the first mentioned passage with a source of fluid pressure, means for moving said member to change the station to which said chucking devices are connected to said pair of passages, and means for alternately connecting said pair of passages with a source of fluid pressure and with exhaust.

19. In a metal working machine of the character referred to the combination of a turret, a plurality of spindles carried by said turret, each of said spindles comprising a fluid pressure actuated motor, means for rotating said spindles, means for intermittently rotating said turret whereby said spindles are indexed through a plurality of said tool stations, a member rotatably supported coaxially with said turret having a passage in constant communication with a plurality of said motors, and a pair of passages to be serially connected to said motors at one of said stations, means for connecting the first mentioned passage with a source of fluid pressure, means for rotating said member to change the station to which said motors are connected to said pair of passages, and means for alternately connecting said pair of passages with a source of fluid pressure and with exhaust.

HARRY W. RUPPLE.